(12) United States Patent
Qi et al.

(10) Patent No.: US 12,164,597 B2
(45) Date of Patent: Dec. 10, 2024

(54) SYSTEMS AND METHODS FOR GENERATING SYNTHETIC DATA

(71) Applicant: PwC Product Sales LLC, New York, NY (US)

(72) Inventors: Zhen Qi, Atlanta, GA (US); Mansi Arora, Uttar Pradesh (IN); Bo Li, Shanghai (CN); Yifeng Wang, Shanghai (CN); Samuel Pierce Burns, Philadelphia, PA (US); Joseph David Voyles, Louisville, KY (US); Anand Srinivasa Rao, Boston, MA (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 17/981,931

(22) Filed: Nov. 7, 2022

(65) Prior Publication Data

US 2024/0160698 A1     May 16, 2024

(51) Int. Cl.
| | |
|---|---|
| *G06F 7/00* | (2006.01) |
| *G06F 16/23* | (2019.01) |
| *G06F 18/214* | (2023.01) |
| *G06F 18/22* | (2023.01) |

(52) U.S. Cl.
CPC .......... *G06F 18/214* (2023.01); *G06F 16/23* (2019.01); *G06F 18/22* (2023.01)

(58) Field of Classification Search
CPC ...... G06F 16/23; G06F 16/212; G06F 16/217; G06F 16/213; G06F 16/2246; G06F 16/2379; G06F 16/904; G06F 16/9027; G06F 18/214; G06F 18/22
See application file for complete search history.

(56) References Cited

U.S. PATENT DOCUMENTS

| | | | | |
|---|---|---|---|---|
| 2010/0293123 | A1* | 11/2010 | Barrett ................... | G06Q 30/00 706/13 |
| 2011/0213759 | A1* | 9/2011 | Zazrivec ............... | G06F 16/213 707/769 |
| 2017/0351656 | A1* | 12/2017 | Lysanov ............... | G06F 40/143 |
| 2018/0165308 | A1* | 6/2018 | Schubert ............. | G06Q 10/101 |
| 2021/0406688 | A1* | 12/2021 | Ok ........................ | G06V 10/774 |
| 2022/0004881 | A1* | 1/2022 | Park ...................... | G06N 3/047 |

\* cited by examiner

*Primary Examiner* — Mohammad A Sana
(74) *Attorney, Agent, or Firm* — Morrison & Foerster LLP

(57) ABSTRACT

System and methods for generating synthetic data according to a plurality of options are provided. According to a first option, synthetic data is generated based on an indication of one or more target distributions. According to a second option, a one or more target distributions are determined based on a sample data set, and synthetic data is generated based on the determined target distribution(s). According to a third option, a temporary synthetic data set is generated based on an indication of one or more target distributions, matches between the temporary synthetic data set and a sample data set are then identified, and a synthetic data set is then generated based on the identified matches. A system may automatically determine which option to leverage based on whether a user provides a sample data set, one or more target distributions, or both.

38 Claims, 3 Drawing Sheets

SYSTEMS AND METHODS FOR GENERATING SYNTHETIC DATA

FIELD

This disclosure relates generally to synthetic data, and more specifically to techniques for generating synthetic data including based on indicated target distribution data.

BACKGROUND

Data augmentation, database testing, AI model training, and AI model diagnosis often require large data sets that may not be readily available or easily accessible. In some cases, systems may have access to large amounts of data, but the data sets may not include the required information or information having the required statistical attributes and characteristics for the intended use case. One solution to lack of data sets for required applications is to generate synthetic data sets.

SUMMARY

As described above, synthetic data sets may be generated such that the synthetic data sets can be used for various applications, including but not limited to training, evaluating, diagnosing, and validating AI models. However, known techniques for generating synthetic data sets have various drawbacks, including that they are insufficiently flexible and do not allow users and/or systems to easily select between multiple available data-set generation techniques depending on initial data availability, knowledge of desired distributions for the synthetic data set, and/or other considerations regarding the intended use of the synthetic data set. Thus, there is a need for improved systems and methods for generating synthetic data sets in a flexible and robust manner, including when only a small sample data set is initially available, or when only information about desired distributions is initially available, or when both a sample data set and desired distributions are initially available but the sample data set does not fulfill the desired distribution and/or is of insufficient size.

Disclosed herein are systems and methods that may address one or more of the above-identified needs. In some embodiments, a computerized system is configured to selectively use one or more techniques to generate one or more synthetic data sets. The system may determine which of a plurality of different synthetic data generation techniques to use based on what input data and/or user instructions are received. In some embodiments, the synthetic data generation engine may select from amongst three available techniques. In some embodiments, the system may select:
  a first synthetic data generation technique if distribution(s) data only is received (and a sample data set is not received);
  a second synthetic data generation technique if a sample data set only is received (and distribution(s) data is not received); and/or
  a third synthetic data generation technique if both sample data and distribution(s) data are received.

As described in greater detail below, the first synthetic data generation technique may include generating a synthetic data set in accordance with indicated target distribution(s) data from the received user input. The second synthetic data generation technique may include generating a synthetic data set based on one or more target distributions that are determined based on the received sample data set.

The third synthetic data generation technique may include generating a synthetic data set creating a temporary synthetic data set based on the indicated target distribution(s) and then identifying one or more matches in the received sample data set that match entities from the temporary synthetic data set. The synthetic data generation engine may generate a final synthetic data set that includes the identified matches in the user-supplied data set, such that the final synthetic data set follows the desired user-indicated target distribution(s).

In some embodiments, a first system for generating synthetic data is provided, the first system comprising one or more processors and memory storing instructions to cause the first system to: receive a sample data set; receive a first input comprising an indication of one or more target distributions; generate a temporary synthetic data set based on the indication of the one or more target distributions; identify a plurality of entities in the sample data set that match one or more entities in the temporary synthetic data set; and generate the synthetic data set based on the identified plurality of entities in the sample data set.

In some embodiments of the first system, the instructions cause the system to, before identifying the plurality of entities in the sample data set, apply one or more data processing operations to the sample data set.

In some embodiments of the first system, the instructions cause the system to, before identifying the plurality of entities in the sample data set, apply one or more distribution processing operations to the received indication of the one or more target distributions.

In some embodiments of the first system: applying the one or more distribution processing operations comprises determining an order for a plurality of distributions in the one or more target distributions; and generating the temporary synthetic data set based on the indication of the one or more target distributions comprises generating the temporary synthetic data set based on the determined order for the plurality of distributions.

In some embodiments of the first system, the instructions cause the system to select a synthetic data generation option from among a plurality of options, wherein the steps of generating the temporary data set and identifying the plurality of entities, and generating the synthetic data set are performed in accordance with selecting the synthetic data generation option.

In some embodiments of the first system, selecting the synthetic data generation option is performed based on receiving the sample data set and receiving the first input comprising the indication of the one or more target distributions.

In some embodiments of the first system, generating the temporary synthetic data set comprises: determining that the indication of the one or more target distributions comprises an overlap in joint and marginal distribution data; and in accordance with determining that the indication of the one or more target distributions comprises the overlap, using the joint distribution data for generating the temporary synthetic data set.

In some embodiments of the first system, generating the temporary synthetic data set comprises, in accordance with determining that the indication of the one or more target distributions comprises the overlap, not using the marginal distribution data for generating the temporary synthetic data set.

In some embodiments of the first system, generating the temporary synthetic data set comprises: determining that the indication of the one or more target distributions does not comprise an overlap in joint and marginal distribution data; and in accordance with determining that the indication of the one or more target distributions does not comprises an overlap in joint and marginal distribution data, using the joint distribution data and the marginal distribution data for generating the temporary synthetic data set.

In some embodiments of the first system, identifying the plurality of entities in the sample data set that match the one or more entities in the temporary synthetic data set comprises applying a digital-twin algorithm.

In some embodiments of the first system, identifying the plurality of entities in the sample data set that match the one or more entities in the temporary synthetic data set comprises computing a match score representative of the level of similarity between the plurality of entities in the sample data set that match the one or more entities in the temporary synthetic data set.

In some embodiments of the first system: the instructions cause the system to assess whether one or more of the identified plurality of entities in the sample data set satisfy one or more criteria, and generating the synthetic data set based on the identified plurality of entities is performed in accordance with determining that the one or more criteria are satisfied.

In some embodiments of the first system, the instructions cause the system to, in accordance with determining that the one or more criteria are not satisfied: update one or more settings for a first algorithm that was used to generate the temporary synthetic data set; generate an updated temporary data set based on the updated first algorithm and based on the indication of the one or more target distributions; identify an updated plurality of entities in the sample data set that match one or more of the entities in the updated temporary synthetic data set; and generate the synthetic data set based on the updated identified plurality of entities in the sample data set.

In some embodiments of the first system, the instructions cause the system to, in accordance with determining that the one or more criteria are not satisfied: update one or more settings for a second algorithm that was used to identify entities in the sample data set; identify an updated plurality of entities in the sample data set that match one or more of the entities in the temporary synthetic data set; and generate the synthetic data set based on the updated identified plurality of entities in the sample data set.

In some embodiments of the first system, the instructions cause the system to, in accordance with determining that the one or more criteria are not satisfied: update one or more settings for a first algorithm that was used to generate the temporary synthetic data set; update one or more settings for a second algorithm that was used to identify entities in the sample data set; generate an updated temporary data set based on the updated first algorithm and based on the indication of the one or more target distributions; identify an updated plurality of entities in the updated sample data set that match one or more of the entities in the temporary synthetic data set; and generate the synthetic data set based on the updated identified plurality of entities in the sample data set.

In some embodiments of the first system, assessing whether one or more of the identified plurality of entities in the sample data set satisfy one or the more criteria comprises determining whether a match score, representative of the level of similarity between the plurality of entities in the sample data set that match the one or more entities in the temporary synthetic data set, exceeds a match score threshold.

In some embodiments of the first system, the instructions cause the system to train an AI model using the generated synthetic data set.

In some embodiments, a first method for generating synthetic data is provided, the first method performed by a system comprising one or more processors, the first method comprising: receiving a sample data set; receiving a first input comprising an indication of one or more target distributions; generating a temporary synthetic data set based on the indication of the one or more target distributions; identifying a plurality of entities in the sample data set that match one or more entities in the temporary synthetic data set; and generating the synthetic data set based on the identified plurality of entities in the sample data set.

In some embodiments, a first non-transitory computer-readable storage medium storing instructions for generating synthetic data is provided, the instructions configured to be executed by a system comprising one or more processors to cause the system to: receive a sample data set; receive a first input comprising an indication of one or more target distributions; generate a temporary synthetic data set based on the indication of the one or more target distributions; identify a plurality of entities in the sample data set that match one or more entities in the temporary synthetic data set; and generate the synthetic data set based on the identified plurality of entities in the sample data set.

In some embodiments, a second system for generating synthetic data is provided, the second system comprising one or more processors and memory storing instructions to cause the second system to: receive one or both of the following: a sample data set, and a first input comprising an indication of one or more target distributions; select an option from amongst a plurality of options for generating a synthetic data set; in accordance with selecting a first option of the plurality of options: generate the synthetic data set based on the indication of the one or more target distributions; in accordance with selecting a second option of the plurality of options: determine a target distribution based on the sample data set; and generate the synthetic data set based on the of the determined target distribution; and in accordance with selecting a third option of the plurality of options: generate a temporary synthetic data set based on the indication of the one or more target distributions; identify a plurality of entities in the sample data set that match one or more of the entities in the temporary synthetic data set; and generate the synthetic data set based on the identified plurality of entities in the sample data set.

In some embodiments, a second method for generating synthetic data is provided, the second method performed by a system comprising one or more processors, the second method comprising: receiving one or both of the following: a sample data set, and a first input comprising an indication of one or more target distributions; selecting an option from amongst a plurality of options for generating a synthetic data set, wherein the plurality of options include the following: a first option comprising the step of: generating the synthetic data set based on the indication of the one or more target distributions; a second option comprising the steps of: determining a target distribution based on the sample data set; and generating the synthetic data set based on the of the determined target distribution; and a third option comprising the steps of: generating a temporary synthetic data set based on the indication of the one or more target distributions; identifying a plurality of entities in the sample data set that match one or more of the entities in the temporary synthetic data set; and generating the synthetic data set based on the identified plurality of entities in the sample data set; and executing the selected option.

In some embodiments, a third non-transitory computer-readable storage medium storing instructions for generating synthetic data is provided, the instructions configured to be executed by a system comprising one or more processors to cause the system to: receive one or both of the following: a sample data set, and a first input comprising an indication of one or more target distributions; select an option from amongst a plurality of options for generating a synthetic data set; in accordance with selecting a first option of the plurality of options: generate the synthetic data set based on the indication of the one or more target distributions; in accordance with selecting a second option of the plurality of options: determine a target distribution based on the sample data set; and generate the synthetic data set based on the of the determined target distribution; and in accordance with selecting a third option of the plurality of options: generate a temporary synthetic data set based on the indication of the one or more target distributions; identify a plurality of entities in the sample data set that match one or more of the entities in the temporary synthetic data set; and generate the synthetic data set based on the identified plurality of entities in the sample data set.

In some embodiments, any one or more of the features of any of the embodiments described above may be combined, in whole or in part, with one another and/or with any one or more features described elsewhere herein.

BRIEF DESCRIPTION OF FIGURES

The invention will now be described, by way of example only, with reference to the accompanying drawings, in which.

DETAILED DESCRIPTION

Figure 1:
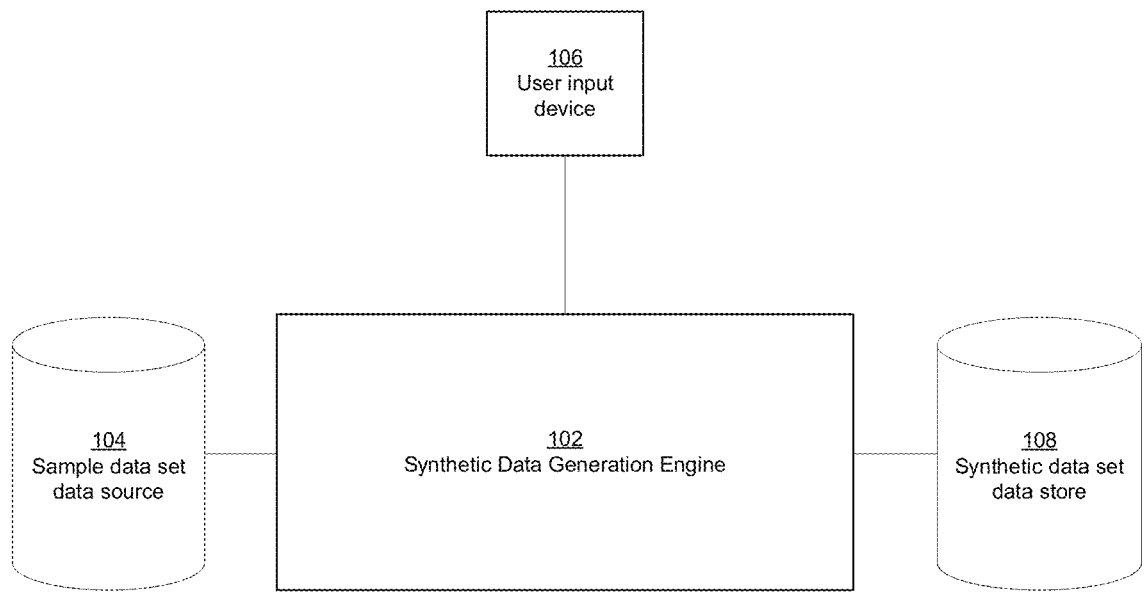
FIG. 1. shows a system for generating synthetic data sets, in accordance with some embodiments.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Disclosed herein are systems, methods, and techniques for generating synthetic data sets. In some embodiments, a computerized system is configured to selectively use one or more techniques to generate one or more synthetic data sets. The system may determine which of a plurality of different synthetic data generation techniques to use based on what input data and/or user instructions are received. The system may then generate a synthetic data set using the selected technique(s).

In some embodiments, the system may be a computerized system comprising a synthetic data generation engine comprising one or more processors. The synthetic data generation engine may be communicatively coupled to a sample data set data source and may be configured to receive one or more sample data sets therefrom. The synthetic data generation engine may be communicatively coupled to a user input device and may be configured to receive one or more user inputs therefrom, wherein the one or more user inputs may indicate one or more target distributions for synthetic data to be generated.

The synthetic data generation engine may determine which of a plurality of synthetic data generation techniques to use, for example by selecting from among a set of available techniques. In some embodiments, the synthetic data generation engine may select from amongst three available techniques. In some embodiments, the system may select:

a first synthetic data generation technique if distribution(s) data only is received (and a sample data set is not received);

a second synthetic data generation technique if a sample data set only is received (and distribution(s) data is not received); and/or a third synthetic data generation technique if both sample data and distribution(s) data are received.

As described in greater detail below, the first synthetic data generation technique may include generating a synthetic data set in accordance with indicated target distribution(s) data from the received user input. The second synthetic data generation technique may include generating a synthetic data set based on one or more target distributions that are determined based on the received sample data set.

The third synthetic data generation technique may include generating a synthetic data set creating a temporary synthetic data set based on the indicated target distribution(s) and then identifying one or more matches in the received sample data set that match entities from the temporary synthetic data set. The synthetic data generation engine may then assess the identified matches to determine whether the quality of the identified matches is sufficient, for example by determining whether one or more match-score criteria are satisfied. If it is determined that the quality of matches is not sufficient, then the synthetic data generation engine may update one or more settings for temporary synthetic data set generation and/or for match identification. The synthetic data generation engine may then iterate the process (e.g., by generating a new temporary synthetic data set and/or by selecting/scoring/evaluating matches again). This iterative process may continue until it is determined that match quality is sufficient. Once synthetic data generation engine determines that match quality is sufficient, the synthetic data generation engine may generate a final synthetic data set that includes the identified matches in the user-supplied data set, such that the final synthetic data set follows the desired user-indicated target distribution(s).

FIG. 1. shows a system 100 for generating synthetic data sets, in accordance with some embodiments. In some embodiments, system 100 is a computer system comprising one or more processors configured to selectively use one or more techniques to generate one or more synthetic data sets. System 100 may determine which of a plurality of different synthetic data generation techniques to use based on what input data and/or user instructions are received. System 100 may then generate a synthetic data set using the selected technique(s).

As shown in FIG. 1, system 100 may comprise synthetic data generation engine 102, which may comprise one or more processors configured to cause engine 102 to receive data, process received data, generate new data (e.g., based on processing received data, and/or transmit data). Synthetic data generation engine 102 may be provided locally and/or remotely to one or more of the other components of system 100. For example, synthetic data generation engine 102 may be provided by a processor executing a locally-stored program on a computer device (e.g., a desktop or laptop computer), or synthetic data generation engine 102 may be provided by one or more servers that provide a web-accessible service.

Synthetic data generation engine 102 may be communicatively coupled to sample data set data source 104 and may be configured to receive one or more sample data sets therefrom. Sample data set data source 104 may comprise any suitable computer system and/or computer-readable storage medium configured to store and/or transmit a sample data set to synthetic data generation engine 102. For example, sample data set data source 104 may comprise a locally-stored and/or remotely-stored database. In some embodiments, sample data set data source 104 may be provided as part of a remote user's computer system and/or a remote computer network, either of which may transmit the sample data set to synthetic data generation engine 102.

Synthetic data generation engine 102 may be communicatively coupled to user input device 106 and may be configured to receive one or more user inputs therefrom, wherein the one or more user inputs may specify settings, selections, preferences, or the like for use in generating a synthetic data set. User input device 106 may comprise any suitable input device, such as a keyboard, mouse, touch-sensitive device, touch-screen, microphone, or the like. User input device 106 may be provided locally and/or remotely from synthetic data generation engine 102. In some embodiments, user input device 106 may be provided remotely from synthetic data engine 102, for example in embodiments in which user input device 106 is provided via a web user's computer system and synthetic data generation engine 102 is provided by one or more web servers accessed by the web user.

Synthetic data generation engine 102 may be communicatively coupled to synthetic data set data store 108 and may be configured to transmit generated synthetic data sets to synthetic data set data store 108 for storage therein. Synthetic data set data store 108 may comprise any suitable computer system and/or computer-readable storage medium configured to store a synthetic data set generated by synthetic data generation engine 102. For example, synthetic data set data store 108 may comprise a locally-stored and/or remotely-stored database. In some embodiments, synthetic data set data store 108 may be provided as part of a remote user's computer system and/or a remote computer network, either of which may receive transmission of the synthetic data set from synthetic data generation engine 102.

Figure 2:
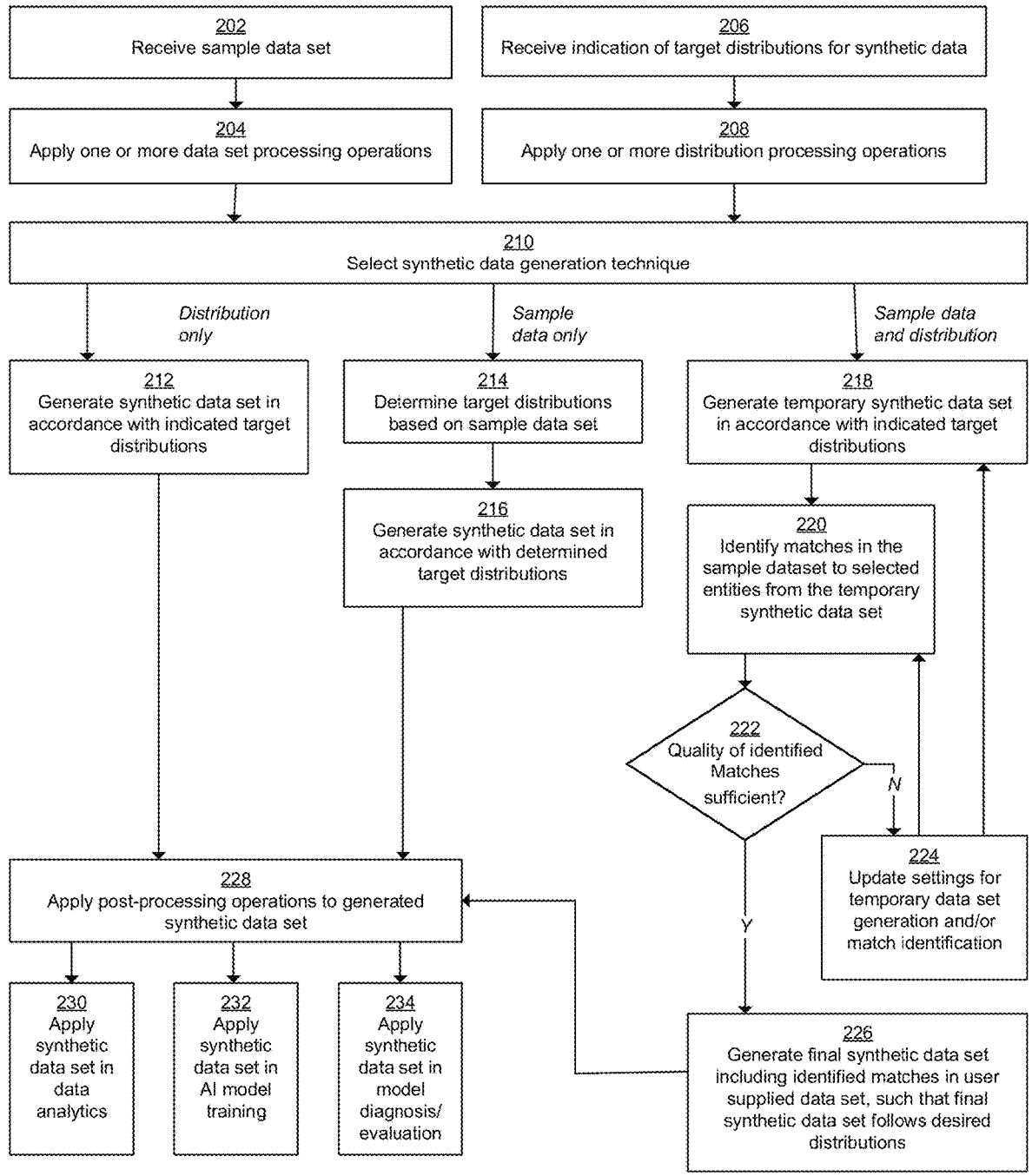
FIG. 2 shows a method for generating synthetic data sets, in accordance with some embodiments.

FIG. 2 shows a method 200 for generating synthetic data sets, in accordance with some embodiments. Method 200 may be executed by a computer-processor-based system. In some embodiments, method 200 may be executed by system 100 and/or by synthetic data generation engine.

At block 202, in some embodiments, a system (e.g., system 100 and/or synthetic data generation engine 102) may receive a sample data set. The sample data set may be received, for example, by synthetic data generation engine 102 from a sample data set data source such as sample data set data source 104. Receipt of the sample data set may comprise retrieving the sample data set from a storage location, receiving transmission of the sample data set, receiving upload of the sample data set, and/or scraping the sample data set, e.g., from a network location. The system may receive the sample data set in accordance with one or more user instructions (e.g., an instruction to retrieve a sample data set and/or an instruction to transmit/upload a sample data set). Additionally or alternatively, the system may receive the sample data set in accordance with one or more automated system actions, for example performed in response to a predefined schedule and/or in accordance with one or more trigger conditions being met.

At block 204, in some embodiments, the system may apply one or more data set processing operations to the received sample data set. Data set processing operations applied to a received sample data set may include an initial checking operation, which may include a value check and/or a type check. Such checks scan for suspicious outlier values and/or mixed data types in each variable. The system may process the received sample data set to confirm the validity and/or usability of any or all portions of the received data set. If any issues are found during a data set checking procedure, corrective measures may be initiated and/or an alert may be generated and provided; in some embodiments, settings and/or inputs that correspond to a portion of the sample data set that has failed a checking procedure may be discarded (or automatically modified).

Following initial checking procedures, the system may encode nominal data type into an integer array, thus allowing determination of distributions based on the supplied sample data set. For example, genders 'Female' and 'Male' through nominal encoding become 0 and 1. Variables with multiple categories can be similarly encoded.

At block 206, in some embodiments, the system may receive an indication of one or more target distributions for synthetic data. The indication of one or more target distributions may be received, for example, by synthetic data generation engine 102 from a user input device such as user input device 106. Receipt of the indication of one or more target distributions may comprise receiving transmission of a user input and/or receiving a representation of user input data. The system may receive the indication of the one or more target distributions from a remote user and/or from a local user.

At block 208, in some embodiments, the system may apply one or more distribution processing operations to received data representing the one or more target distributions. Distribution processing operations applied to received distribution(s) may include an initial checking operation, which may include checking if the specified distribution(s) are allowed and valid in regard to the specified parameters for the distributions. For example, the system may support many types of distributions, but not all possible types. The system may check whether a specified distribution(s) is supported or not. In addition, the supplied parameters for each specified distribution may be checked to see if enough parameters are provided. For example, a normal distribution may need to have mean and standard deviation, and the system may check to confirm that they are provided. The system may process received distribution data set to confirm the validity and/or usability of any or all portions of the received distribution data. If any issues are found during a distribution checking procedure, corrective measures may be initiated and/or an alert may be generated and provided; in some embodiments, settings and/or inputs that correspond to a portion of distribution data set that has failed a checking procedure may be discarded (or automatically modified).

Following initial checking procedures, the system may determine a priority amongst desired distributions. Joint distributions may be assigned higher priority than marginal distributions. Based on that principle, desired distributions indicated by the received distribution data may be assigned respective priorities with respect to one another. This may allow the system to determine how to address possible conflicts amongst joint distributions and marginal distributions, as described in further detail below.

While FIG. 2 shows blocks 204 and 208 preceding block 210, in some embodiments data set processing operations and/or distribution processing operations may be performed after selection of a synthetic data generation technique.

At block 210, in some embodiments, the system may select a synthetic data generation technique. The system may in some embodiments select a synthetic data generation technique based on (a) whether a sample data set has been received and based on (b) whether an indication of target distribution(s) has been received. The system may select a different synthetic data generation technique in each of the following three scenarios:
- a first synthetic data generation technique may be selected if distribution(s) data only is received and a sample data set is not received;
- a second synthetic data generation technique may be selected if a sample data set only is received and distribution(s) data is not received; and
- a third synthetic data generation technique may be selected if both sample data and distribution(s) data are received.

In some embodiments, the system may additionally or alternatively select between synthetic data generation techniques based on user preferences, system settings, whether one or more additional/alternative trigger conditions are met, and/or explicit user selection of a synthetic data generation technique.

Below, block 212 describes a first synthetic data generation technique, which may be selected at block 210 in accordance with a determination that distribution(s) data only is received and a sample data set is not received; blocks 214-216 describe a second synthetic data generation technique, which may be selected at block 210 in accordance with a determination that a sample data set only is received and distribution(s) data is not received; and blocks 218-226 describe a third synthetic data generation technique, which may be selected at block 210 in accordance with a determination that both sample data and distribution(s) data are received.

At block 212, the system may apply a first synthetic data generation technique. The first synthetic data generation technique may be selected by the system in accordance with a determination by the system that distribution data was received and that a sample data set was not received. Additionally or alternatively, the first synthetic data generation technique may be selected by the system in accordance with a user instruction.

At block 212, in some embodiments, the system may generate a synthetic data set in accordance with the indicated target distributions. The system may use the priority of distributions described above (joint distributions assigned higher priority than marginal distributions) to randomly sample the synthetic data.

In some embodiments, when the system receives an indication of a plurality of desired distributions (e.g., based on one or more user inputs), there may be conflicts among the indicated desired distributions. For example, if there are two variables, x and y, a user may specify a joint distribution between x and y as f(x, y) and may specify respective marginal distributions of x and y as f(x) and f(y), respectively. It is possible that a joint distribution $f_{joint}(x, y)$ based on x with the provided marginal distribution f(x) and y with the provided marginal distribution f(y) may not be the same as the provided joint distribution f(x, y). To address such a conflict, the following rules may be applied:

Joint distributions may be given a higher priority than the marginal distributions. Thus, joint distributions may be used first for synthetic data generation, and then marginal distributions may be used afterwards (e.g., assuming there is no confliction) for synthetic data generation.

If a variable with marginal distribution is also included in a supplied (e.g., user-specified) joint distribution, the marginal distribution may not be used for synthetic data generation. After synthetic data is generated (e.g., after an entire synthetic data set is generated), however, marginal distributions may be checked against statistics of the generated synthetic data. If there are significant differences (e.g., beyond a maximum acceptable threshold difference) between the marginal distribution(s) of the generated synthetic data and the user-specified marginal distribution(s), warning messages may be sent to the user, different data may be generated, and/or unacceptable data may be removed from the generated synthetic data set. Similarly, when two joint distributions have overlaps on variables, one joint distribution may be used for synthetic data generation, while the unused joint distribution may be left for the check of generated synthetic data.

When checking a user-specified marginal or joint distribution, the validity of its parameters may be checked and an input may be discarded if the check does not pass or a default setting is used. The supplied parameters for each specified distribution may be checked to see if enough parameters are provided. For example, a normal distribution needs to have mean and standard deviation, and the system may check to ensure that those are provided. A relevant message indicating that the check was not passed may be sent to the user.

In some embodiments, if a variable in a marginal distribution is not in any joint distributions, then the relevant marginal distribution may be used in data generation. Otherwise, the relevant marginal distributions may be used in data checking.

At blocks 214-216, the system may apply a second synthetic data generation technique. The second synthetic data generation technique may be selected by the system in accordance with a determination by the system that distribution data was not received and that a sample data set was received. Additionally or alternatively, the second synthetic data generation technique may be selected by the system in accordance with a user instruction.

At block 214, in some embodiments, the system may determine one or more target distributions based on the received sample data set. The system may learn both marginal distributions and joint distributions from the sample dataset. In some embodiments, to learn distributions from a supplied sample data set, the system may apply a two-dimensional two-sample Kolmogorov-Smirnov test. The two-dimensional two-sample Kolmogorov-Smirnov test is a bivariate version of the regular Kolmogorov-Smirnov that may be used to identify if two given samples come from the same marginal distribution. Usually, this test is performed on the one-dimensional data, however, as disclosed herein, the test may be used to derive bivariate distributions for pairs of continuous variables in the dataset.

At block 216, in some embodiments, the system may generate a synthetic data set in accordance with the determined one or more target distributions. In some embodiments, the synthetic data set generation process of block 216 may share any one or more characteristics in common with the synthetic data set generation process at block 212.

At blocks 218-226, the system may apply a third synthetic data generation technique. The third synthetic data generation technique may be selected by the system in accordance with a determination by the system that distribution data was received and that a sample data set was also received. Additionally or alternatively, the third synthetic data generation technique may be selected by the system in accordance with a user instruction. The third synthetic data generation technique may allow for records in the sample data set to be re-sampled and for a new data set to be generated that follows the specified distribution(s).

At block 218, in some embodiments, the system may generate a temporary synthetic data set in accordance with the indicated target distribution(s). In some embodiments, the synthetic data set generation process of block 218 may share any one or more characteristics in common with either or both of the synthetic data set generation processes at blocks 212 and/or 216.

At block 220, in some embodiments, the system may identify one or more matches in the sample data set to entities selected from the temporary synthetic data set. In some embodiments, identifying a match may comprise generating a match score representing a degree of similarity between an entity in the temporary synthetic data set and a corresponding entity in the sample data set. Identifying one or more matches in the sample data set to entities in the temporary synthetic data set may comprise using a matching algorithm such as a digital-twin algorithm.

A digital-twin algorithm may be used for searching matches between two datasets. Here, these two datasets are (1) the temporary synthetic data set generated by the system based on the indicated desired distribution(s) and (2) the sample dataset. To evaluate and rank each match, the following formula for a match score may be used:

$$\text{Matching score} = \text{fraction} * \text{distance\_based\_score} + (1 - \text{fraction}) * (\text{weight influence}) \quad (1)$$

where:

$$\text{fraction} = 0.9 \quad (2)$$

$$\text{distance\_based\_score} = 1 / (1 + \text{Weighted\_Manhattan\_Distance}) \quad (3)$$

weight influence =

$$\frac{\max\left(\min_{crop}, \min\left(\max_{crop}, a * \frac{b * \log(N * W_i)}{1 + |b * \log(N * W_i)|} + 1\right)\right)}{\text{Normalization factor}}$$

where:
$\min_{crop} = 0$
$\max_{crop} = 2$
$a = 3$
$b = 0.1$
N is the size of population
$W_i$ is the weight of the individual i $$\text{Normalization factor} = a * \frac{b * \log(N)}{1 + b * \log(N)} + 1 \quad (4)$$

Values of the constants in the formulas above may be adjusted based on user needs or preferences and/or based on empirical review of outcomes of application of the formulas to different data sets and distributions.

The digital-twin algorithm may consider and allow for use-cases in which records in the sample data set are weighted. Very often, a real dataset is a sampled one with each individual representing a group of similar individuals. Thus, each individual in the sampled subpopulation is assigned with an individual weight. For example, the sample data set may be a survey on a subpopulation that is intentionally used to represent an overall population. In these cases, each individual in the sample data set may be assigned an individual weight representing the individual's representativeness of a corresponding group of similar individuals. The relationship between the contribution of attribute matching to the overall matching score and the contribution of individual weight may be effectively characterized as additive, with the weight contribution being bounded in the matching evaluation formula. The influence of individual weights on the matching score may be bounded with cropping functions, and may be normalized. With these principles, e.g. as embodied in the formulas shown above, an individual with a greater weight may contribute more to the overall matching score while still being limited to a (e.g., predefined) upper limit. In the synthetic data generation, the majority contribution may be from the set of attributes, and the individual weights may also have an impact, but to a limited extent. This approach may allow for the system to account for the representativeness of each individual in an evaluation formula in addition to attributes. Results achieved with these principles and/or the formulas above may deliver good performance in ranking matches in terms of matching similarity while accounting for the meaningful influence of individual weights. In some embodiments, a user of the system may be able to designate whether sample weights are to be used, thereby allowing flexibility and generalization.

At block 222, in some embodiments, the system may determine whether a quality of one or more identified matches satisfies one or more match criteria. In some embodiments, determining whether one or more match criteria are met may comprise determining whether a match score exceeds a predetermined or dynamically determined match score threshold. In some embodiments, matches as a whole population are evaluated to determine if the said matches meet the one or more match criteria. Here, all match scores may be gathered together and considered as a whole population. Criteria such as the distribution from the whole population of the match scores being a normal distribution or other common types may be considered and checked. When a synthetic data set needs to maintain one or more attribute relationships at the individual entity level and needs to follow one or more distributions at the population level, the approaches described herein provides the unprecedented capability to do so.

In some embodiments, the one or more match criteria may include statistical criteria for statistics of matching performance. For example, a statistical check may be executed to determine if one or more distributions of matches meets statistical distribution criteria. For example, the matches may be evaluated to determine whether the distribution of similarity scores for the matches follows criteria (e.g., being in a bell-curve shape or in another predetermined shape). Additionally or alternatively, matches may be evaluated to determine whether a threshold percentage of the matches are within an acceptable match-score threshold.

In accordance with determining at block 222 that the one or more match criteria are not satisfied, the system may proceed to block 224.

At block 224, in some embodiments, the system may update one or more settings for temporary synthetic data set generation and/or for match identification.

Updating a setting for temporary synthetic data set generation may comprise updating a setting of an algorithm used to generate the temporary synthetic data set, selecting a different algorithm used to generate the temporary synthetic data set, updating a manner in which distributions are prioritized and/or otherwise used in generating the temporary synthetic data set, and/or updating the overall size of the generated temporary synthetic data set.

Updating a setting for match identification may comprise updating a setting of an algorithm for searching and selecting good matches from the sample data set and/or updating a setting of an algorithm for generating a match score. For example, such settings include the constants such as fraction, a, b, and others in the formulae for the digital twin matching algorithm described previously.

Following updating the one or more settings at block 224, the system may revert to block 218 and/or to block 220 to repeat one or more of those steps based on the updated settings, and may then repeat block 222 based on matches identified following updating the one or more settings. In some embodiments, the system may iterate through the loop of blocks 218-224 and/or 220-224 any suitable number of times. Optionally, the system may cease iterations if a maximum number of iterations, maximum time spent iterating, maximum memory usage, and/or maximum processing resources are used during the iteration process.

In accordance with determining at block 222 that the one or more match criteria are satisfied, the system may proceed to block 226.

At block 226, in some embodiments, the system may generate a final synthetic data set including identified matches in the user-supplied data set, such that the final synthetic data set follows the desired indicated one or more distributions.

At block 228, which may follow from block 212, block 216, and/or block 226, in some embodiments, the system may apply one or more post-processing operations to the generated synthetic data set. This may include decoding of previously encoded nominal values.

At block 230, in some embodiments, the system may apply the generated synthetic data set in one or more data analytics operations.

At block 232, in some embodiments, the system may apply the generated synthetic data set in one or more AI model training operations. Synthetic data sets generated in accordance with one or more of the techniques described herein may be used to effectively train AI models including classifiers and regressors with methods like random forest and/or XGBoost, which may then be used to make predictions.

At block 234, in some embodiments, the system may apply the generated synthetic data set in one or more model diagnosis/evaluation operations.

In some embodiments, following generating the synthetic data set, the system may store the synthetic data set locally and/or remotely (e.g., by storing it in synthetic data set data store 108), transmit the synthetic data set to one or more other systems, generate one or more alerts and/or outputs based on the synthetic data set, generate and/or display one or more visualizations based on the synthetic data set, and/or automatically trigger one or more automated system functionalities based on the synthetic data set (e.g., in accordance with determining whether the synthetic data set satisfies one or more triggering criteria).

The techniques described herein, including providing automated selection between various synthetic data generation techniques and providing techniques for generating a synthetic data set based on both a sample data set and specified distribution information, may have various useful applications. For example, the techniques described herein may allow for information from real people represented a survey data set (e.g., a healthcare survey data set) to be used to create a synthetic data, to augmented real data with synthetic data, and/or to sub-select from amongst real data to select only a subset of the real data. The resulting synthetic data set may then be used for AI model training and optionally, in the healthcare space, for automated diagnosis.

In use-cases in which a user specifies a desired distribution for a synthetic dataset, the system can use random data generation to directly to generate data. Although distributions can provide relationships among attributes at the population level, the relationships at each record may not be captured. For example, the relationship between education and income for each individual may not be captured. Such individual level relationships are not likely kept when using population level statistics to generate synthetic data, but are maintained in a real sample data set. In some embodiments, real records from a sample data set may be used for true relationships among attributes, while the desired distributions at the population level in the final generated synthetic data may still be followed by the overall synthetic data set (e.g., generated using resampled original real data set based on the digital twin matching algorithm).

Synthetic data sets generated using one or more of the techniques described herein may exhibit many of the characteristics of real-world data sets, and may greatly reduce random noise and improve the trustworthiness of trained AI models (e.g., as compared to those trained using synthetic data generated using other techniques). Synthetic data sets generated in accordance with one or more of the techniques described herein may be used to effectively train AI models including classifiers and regressors with methods like random forest and/or XGBoost, which may then be used to make predictions.

Figure 3:
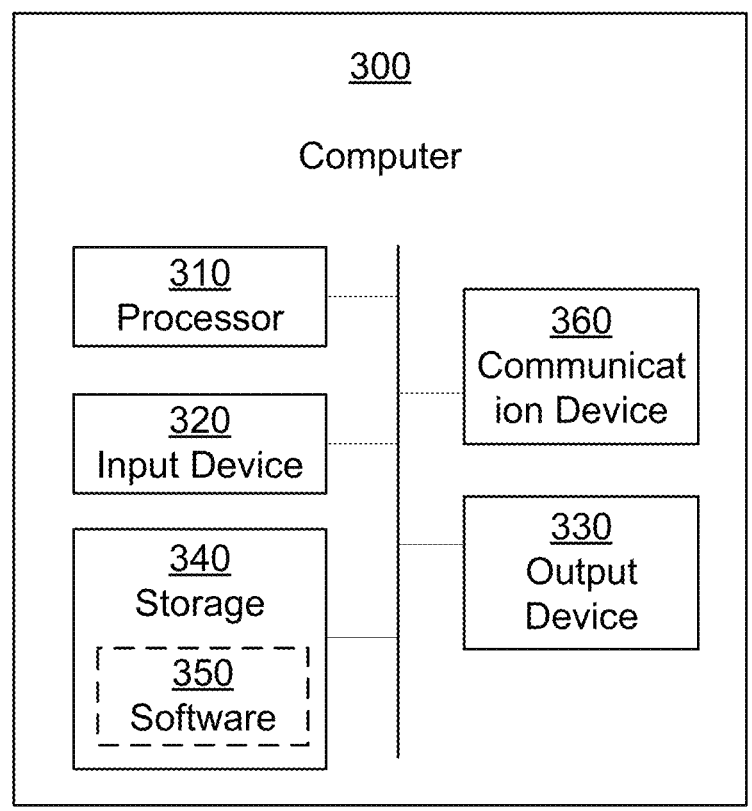
FIG. 3 shows a device for implementing a random sampling-based merging algorithm, in accordance with some embodiments.

FIG. 3 illustrates an example of a computing system 300, in accordance with some examples of the disclosure. System 300 can be a client or a server. As shown in FIG. 3, system 300 can be any suitable type of processor-based system, such as a personal computer, workstation, server, handheld computing device (portable electronic device) such as a phone or tablet, or dedicated device. The system 300 can include, for example, one or more of input device 320, output device 330, one or more processors 310, storage 340, and communication device 360. Input device 320 and output device 330 can generally correspond to those described above and can either be connectable or integrated with the computer.

Input device 320 can be any suitable device that provides input, such as a touch screen, keyboard or keypad, mouse, gesture recognition component of a virtual/augmented reality system, or voice-recognition device. Output device 330 can be or include any suitable device that provides output, such as a display, touch screen, haptics device, virtual/augmented reality display, or speaker.

Storage 340 can be any suitable device that provides storage, such as an electrical, magnetic, or optical memory including a RAM, cache, hard drive, removable storage disk, or other non-transitory computer readable medium. Communication device 360 can include any suitable device capable of transmitting and receiving signals over a network, such as a network interface chip or device. The components of the computing system 300 can be connected in any suitable manner, such as via a physical bus or wirelessly.

Processor(s) 310 can be any suitable processor or combination of processors, including any of, or any combination of, a central processing unit (CPU), field programmable gate array (FPGA), and application-specific integrated circuit (ASIC). Software 350, which can be stored in storage 340 and executed by one or more processors 310, can include, for example, the programming that embodies the functionality or portions of the functionality of the present disclosure (e.g., as embodied in the devices as described above)

Software 350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for generating a synthetic data set, comprising one or more processors and memory storing instructions to cause the system to:
   receive a sample data set;
   receive a first input comprising an indication of one or more target distributions;
   generate a temporary synthetic data set based on the indication of the one or more target distributions, wherein generating the temporary synthetic data set comprises one option from the following options:
      determining that the indication of the one or more target distributions comprises an overlap in joint and marginal distribution data, and, in accordance with determining that the indication of the one or more target distributions comprises the overlap, using the joint distribution data for generating the temporary synthetic data set; and
      determining that the indication of the one or more target distributions does not comprise an overlap in joint and marginal distribution data, and, in accordance with determining that the indication of the one or more target distributions does not comprises an overlap in joint and marginal distribution data, using the joint distribution data and the marginal distribution data for generating the temporary synthetic data set;
   identify a plurality of entities in the sample data set that match one or more entities in the temporary synthetic data set; and
   generate the synthetic data set based on the identified plurality of entities in the sample data set.

2. The system of claim 1, wherein the instructions cause the system to, before identifying the plurality of entities in the sample data set, apply one or more data processing operations to the sample data set.

3. The system of claim 1, wherein the instructions cause the system to, before identifying the plurality of entities in the sample data set, apply one or more distribution processing operations to the received indication of the one or more target distributions.

4. The system of claim 1, wherein:
   applying the one or more distribution processing operations comprises determining an order for a plurality of distributions in the one or more target distributions; and
   generating the temporary synthetic data set based on the indication of the one or more target distributions comprises generating the temporary synthetic data set based on the determined order for the plurality of distributions.

5. The system of claim 1, wherein the instructions cause the system to select a synthetic data generation option from among a plurality of options,
   wherein the steps of generating the temporary synthetic data set and identifying the plurality of entities, and generating the synthetic data set are performed in accordance with selecting the synthetic data generation option.

6. The system of claim 5, wherein selecting the synthetic data generation option is performed based on receiving the sample data set and receiving the first input comprising the indication of the one or more target distributions.

7. The system of claim 1, wherein generating the temporary synthetic data set comprises, in accordance with determining that the indication of the one or more target distributions comprises the overlap, not using the marginal distribution data for generating the temporary synthetic data set.

8. The system of claim 1, wherein identifying the plurality of entities in the sample data set that match the one or more entities in the temporary synthetic data set comprises applying a digital-twin algorithm.

9. The system of claim 1, wherein identifying the plurality of entities in the sample data set that match the one or more entities in the temporary synthetic data set comprises computing a match score representative of the level of similarity between the plurality of entities in the sample data set that match the one or more entities in the temporary synthetic data set.

10. The system of claim 1, wherein:
the instructions cause the system to assess whether one or more of the identified plurality of entities in the sample data set satisfy one or more criteria, and
generating the synthetic data set based on the identified plurality of entities is performed in accordance with determining that the one or more criteria are satisfied.

11. The system of claim 10, wherein the instructions cause the system to, in accordance with determining that the one or more criteria are not satisfied:
update one or more settings for a first algorithm that was used to generate the temporary synthetic data set;
generate an updated temporary data set based on the updated first algorithm and based on the indication of the one or more target distributions;
identify an updated plurality of entities in the sample data set that match one or more of the entities in the updated temporary synthetic data set; and
generate the synthetic data set based on the updated identified plurality of entities in the sample data set.

12. The system of claim 10, wherein the instructions cause the system to, in accordance with determining that the one or more criteria are not satisfied:
update one or more settings for a second algorithm that was used to identify entities in the sample data set;
identify an updated plurality of entities in the sample data set that match one or more of the entities in the temporary synthetic data set; and
generate the synthetic data set based on the updated identified plurality of entities in the sample data set.

13. The system of claim 10, wherein the instructions cause the system to, in accordance with determining that the one or more criteria are not satisfied:
update one or more settings for a first algorithm that was used to generate the temporary synthetic data set;
update one or more settings for a second algorithm that was used to identify entities in the sample data set;
generate an updated temporary data set based on the updated first algorithm and based on the indication of the one or more target distributions;
identify an updated plurality of entities in the updated sample data set that match one or more of the entities in the temporary synthetic data set; and
generate the synthetic data set based on the updated identified plurality of entities in the sample data set.

14. The system of claim 10, wherein assessing whether one or more of the identified plurality of entities in the sample data set satisfy one or the more criteria comprises determining whether a match score, representative of the level of similarity between the plurality of entities in the sample data set that match the one or more entities in the temporary synthetic data set, exceeds a match score threshold.

15. The system of claim 1, wherein the instructions cause the system to train an AI model using the generated synthetic data set.

16. A method for generating a synthetic data set, the method performed by a system comprising one or more processors, the method comprising:
receiving a sample data set;
receiving a first input comprising an indication of one or more target distributions;
generating a temporary synthetic data set based on the indication of the one or more target distributions, wherein generating the temporary synthetic data set comprises one option from the following options:
determining that the indication of the one or more target distributions comprises an overlap in joint and marginal distribution data, and, in accordance with determining that the indication of the one or more target distributions comprises the overlap, using the joint distribution data for generating the temporary synthetic data set; and
determining that the indication of the one or more target distributions does not comprise an overlap in joint and marginal distribution data, and, in accordance with determining that the indication of the one or more target distributions does not comprises an overlap in joint and marginal distribution data, using the joint distribution data and the marginal distribution data for generating the temporary synthetic data set;
identifying a plurality of entities in the sample data set that match one or more entities in the temporary synthetic data set; and
generating the synthetic data set based on the identified plurality of entities in the sample data set.

17. A non-transitory computer-readable storage medium storing instructions for generating a synthetic data set, the instructions configured to be executed by a system comprising one or more processors to cause the system to:
receive a sample data set;
receive a first input comprising an indication of one or more target distributions;
generate a temporary synthetic data set based on the indication of the one or more target distributions, wherein generating the temporary synthetic data set comprises one option from the following options:
determining that the indication of the one or more target distributions comprises an overlap in joint and marginal distribution data, and, in accordance with determining that the indication of the one or more target distributions comprises the overlap, using the joint distribution data for generating the temporary synthetic data set; and
determining that the indication of the one or more target distributions does not comprise an overlap in joint and marginal distribution data, and, in accordance with determining that the indication of the one or more target distributions does not comprises an overlap in joint and marginal distribution data, using the joint distribution data and the marginal distribution data for generating the temporary synthetic data set;
identify a plurality of entities in the sample data set that match one or more entities in the temporary synthetic data set; and
generate the synthetic data set based on the identified plurality of entities in the sample data set.

18. A system for generating synthetic data, comprising one or more processors and memory storing instructions to cause the system to:
receive one or both of the following: a sample data set, and a first input comprising an indication of one or more target distributions;
select an option from amongst a plurality of options for generating a synthetic data set;
in accordance with selecting a first option of the plurality of options:
generate the synthetic data set based on the indication of the one or more target distributions;
in accordance with selecting a second option of the plurality of options:
determine a target distribution based on the sample data set; and
generate the synthetic data set based on the determined target distribution; and
in accordance with selecting a third option of the plurality of options:
generate a temporary synthetic data set based on the indication of the one or more target distributions;
identify a plurality of entities in the sample data set that match one or more of the entities in the temporary synthetic data set; and
generate the synthetic data set based on the identified plurality of entities in the sample data set.

19. A method for generating synthetic data, the method performed by a system comprising one or more processors, the method comprising:
receiving one or both of the following: a sample data set, and a first input comprising an indication of one or more target distributions;
selecting an option from amongst a plurality of options for generating a synthetic data set, wherein the plurality of options include the following:
a first option comprising the step of:
generating the synthetic data set based on the indication of the one or more target distributions;
a second option comprising the steps of:
determining a target distribution based on the sample data set; and
generating the synthetic data set based on the determined target distribution; and
a third option comprising the steps of:
generating a temporary synthetic data set based on the indication of the one or more target distributions;
identifying a plurality of entities in the sample data set that match one or more of the entities in the temporary synthetic data set; and
generating the synthetic data set based on the identified plurality of entities in the sample data set; and
executing the selected option.

20. A non-transitory computer-readable storage medium storing instructions for generating synthetic data, the instructions configured to be executed by a system comprising one or more processors to cause the system to:
receive one or both of the following: a sample data set, and a first input comprising an indication of one or more target distributions;
select an option from amongst a plurality of options for generating a synthetic data set;
in accordance with selecting a first option of the plurality of options:
generate the synthetic data set based on the indication of the one or more target distributions;
in accordance with selecting a second option of the plurality of options:
determine a target distribution based on the sample data set; and
generate the synthetic data set based on the determined target distribution; and
in accordance with selecting a third option of the plurality of options:
generate a temporary synthetic data set based on the indication of the one or more target distributions;
identify a plurality of entities in the sample data set that match one or more of the entities in the temporary synthetic data set; and
generate the synthetic data set based on the identified plurality of entities in the sample data set.

21. A system for generating a synthetic data, comprising one or more processors and memory storing instructions to cause the system to:
receive a sample data set;
receive a first input comprising an indication of one or more target distributions;
generate a temporary synthetic data set based on the indication of the one or more target distributions;
identify a plurality of entities in the sample data set that match one or more entities in the temporary synthetic data set;
assess whether one or more of the identified plurality of entities in the sample data set satisfy one or more criteria, and;
in accordance with determining that the one or more criteria are satisfied, generate the synthetic data set based on the identified plurality of entities in the sample data set.

22. The system of claim 21, wherein the instructions cause the system to, before identifying the plurality of entities in the sample data set, apply one or more data processing operations to the sample data set.

23. The system of claim 21, wherein the instructions cause the system to, before identifying the plurality of entities in the sample data set, apply one or more distribution processing operations to the received indication of the one or more target distributions.

24. The system of claim 21, wherein:
applying the one or more distribution processing operations comprises determining an order for a plurality of distributions in the one or more target distributions; and
generating the temporary synthetic data set based on the indication of the one or more target distributions comprises generating the temporary synthetic data set based on the determined order for the plurality of distributions.

25. The system of claim 21, wherein the instructions cause the system to select a synthetic data generation option from among a plurality of options,
wherein the steps of generating the temporary synthetic data set and identifying the plurality of entities, and generating the synthetic data set are performed in accordance with selecting the synthetic data generation option.

26. The system of claim 25, wherein selecting the synthetic data generation option is performed based on receiving the sample data set and receiving the first input comprising the indication of the one or more target distributions.

27. The system of claim 21, wherein generating the temporary synthetic data set comprises:
   determining that the indication of the one or more target distributions comprises an overlap in joint and marginal distribution data; and
   in accordance with determining that the indication of the one or more target distributions comprises the overlap, using the joint distribution data for generating the temporary synthetic data set.

28. The system of claim 21, wherein generating the temporary synthetic data set comprises, in accordance with determining that the indication of the one or more target distributions comprises the overlap, not using the marginal distribution data for generating the temporary synthetic data set.

29. The system of claim 21, wherein generating the temporary synthetic data set comprises:
   determining that the indication of the one or more target distributions does not comprise an overlap in joint and marginal distribution data; and
   in accordance with determining that the indication of the one or more target distributions does not comprises an overlap in joint and marginal distribution data, using the joint distribution data and the marginal distribution data for generating the temporary synthetic data set.

30. The system of claim 21, wherein identifying the plurality of entities in the sample data set that match the one or more entities in the temporary synthetic data set comprises applying a digital-twin algorithm.

31. The system of claim 21, wherein identifying the plurality of entities in the sample data set that match the one or more entities in the temporary synthetic data set comprises computing a match score representative of the level of similarity between the plurality of entities in the sample data set that match the one or more entities in the temporary synthetic data set.

32. The system of claim 21, wherein the instructions cause the system to, in accordance with determining that the one or more criteria are not satisfied:
   update one or more settings for a first algorithm that was used to generate the temporary synthetic data set;
   generate an updated temporary data set based on the updated first algorithm and based on the indication of the one or more target distributions;
   identify an updated plurality of entities in the updated sample data set that match one or more of the entities in the temporary synthetic data set; and
   generate the synthetic data set based on the updated identified plurality of entities in the sample data set.

33. The system of claim 21, wherein the instructions cause the system to, in accordance with determining that the one or more criteria are not satisfied:
   update one or more settings for a second algorithm that was used to identify entities in the sample data set;
   identify an updated plurality of entities in the sample data set that match one or more of the entities in the temporary synthetic data set; and
   generate the synthetic data set based on the updated identified plurality of entities in the sample data set.

34. The system of claim 21, wherein the instructions cause the system to, in accordance with determining that the one or more criteria are not satisfied:
   update one or more settings for a first algorithm that was used to generate the temporary synthetic data set;
   update one or more settings for a second algorithm that was used to identify entities in the sample data set;
   generate an updated temporary data set based on the updated first algorithm and based on the indication of the one or more target distributions;
   identify an updated plurality of entities in the updated sample data set that match one or more of the entities in the temporary synthetic data set; and
   generate the synthetic data set based on the updated identified plurality of entities in the sample data set.

35. The system of claim 21, wherein assessing whether one or more of the identified plurality of entities in the sample data set satisfy one or the more criteria comprises determining whether a match score, representative of the level of similarity between the plurality of entities in the sample data set that match the one or more entities in the temporary synthetic data set, exceeds a match score threshold.

36. The system of claim 21, wherein the instructions cause the system to train an AI model using the generated synthetic data set.

37. A method for generating a synthetic data set, the method performed by a system comprising one or more processors, the method comprising:
   receiving a sample data set;
   receiving a first input comprising an indication of one or more target distributions;
   generating a temporary synthetic data set based on the indication of the one or more target distributions;
   identifying a plurality of entities in the sample data set that match one or more entities in the temporary synthetic data set;
   assess that the one or more of the identified plurality of entities in the sample data set satisfy one or more criteria;
   in accordance with determining that the one or more criteria are satisfied, generating the synthetic data based on the identified plurality of entities in the sample data set.

38. A non-transitory computer-readable storage medium storing instructions for generating a synthetic data set, the instructions configured to be executed by a system comprising one or more processors to cause the system to:
   receive a sample data set;
   receive a first input comprising an indication of one or more target distributions;
   generate a temporary synthetic data set based on the indication of the one or more target distributions;
   identify a plurality of entities in the sample data set that match one or more entities in the temporary synthetic data set;
   assess whether one or more of the identified plurality of entities in the sample data set satisfy one or more criteria;
   in accordance with determining that the one or more criteria are satisfied, generate the synthetic data set based on the identified plurality of entities in the sample data set; and
   train an AI model using the generated synthetic data set.

* * * * *